United States Patent
Mehra et al.

(10) Patent No.: US 11,460,879 B1
(45) Date of Patent: Oct. 4, 2022

(54) SYSTEM AND METHOD FOR CONTROLLING ELECTRICAL CURRENT SUPPLY IN A MULTI-PROCESSOR CORE SYSTEM VIA INSTRUCTION PER CYCLE REDUCTION

(71) Applicant: Advanced Micro Devices, Inc., Santa Clara, CA (US)

(72) Inventors: Amitabh Mehra, Fort Collins, CO (US); Richard Martin Born, Fort Collins, CO (US); Sriram Srinivasan, Fort Collins, CO (US); Sneha Komatireddy, Tempe, AZ (US); Michael L. Golden, Santa Clara, CA (US); Xiuting Kaleen C. Man, Austin, TX (US); Gokul Subramani Ramalingam Lakshmi Devi, Santa Clara, CA (US); Xiaojie He, Santa Clara, CA (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 0 days.

(21) Appl. No.: 17/358,622

(22) Filed: Jun. 25, 2021

(51) Int. Cl.
*G06F 1/10* (2006.01)
*G06F 1/3206* (2019.01)

(52) U.S. Cl.
CPC .............. *G06F 1/10* (2013.01); *G06F 1/3206* (2013.01)

(58) Field of Classification Search
CPC .................................. G06F 1/10; G06F 1/3206
USPC ........................................................ 327/291
See application file for complete search history.

(56) References Cited

U.S. PATENT DOCUMENTS

| | | | | |
|---|---|---|---|---|
| 2008/0098254 | A1* | 4/2008 | Altevogt | G06F 1/3296 713/600 |
| 2015/0169326 | A1* | 6/2015 | Sodhi | G06F 1/08 712/208 |
| 2021/0132123 | A1* | 5/2021 | Mathiyalagan | G06F 1/3296 |

* cited by examiner

*Primary Examiner* — Tomi Skibinski

(57) ABSTRACT

Methods and apparatuses control electrical current supplied to a plurality of processing units in a multi-processor system. A plurality of current usage information corresponding to the processing units are received by a controller to determine a threshold current for each of the processing units. The controller determines a frequency reduction action and an instructions-per-cycle (IPC) reduction action for the each of the processing units based on the threshold current and regulates operations of the processing units based on the determined frequency and IPC reduction actions.

20 Claims, 9 Drawing Sheets

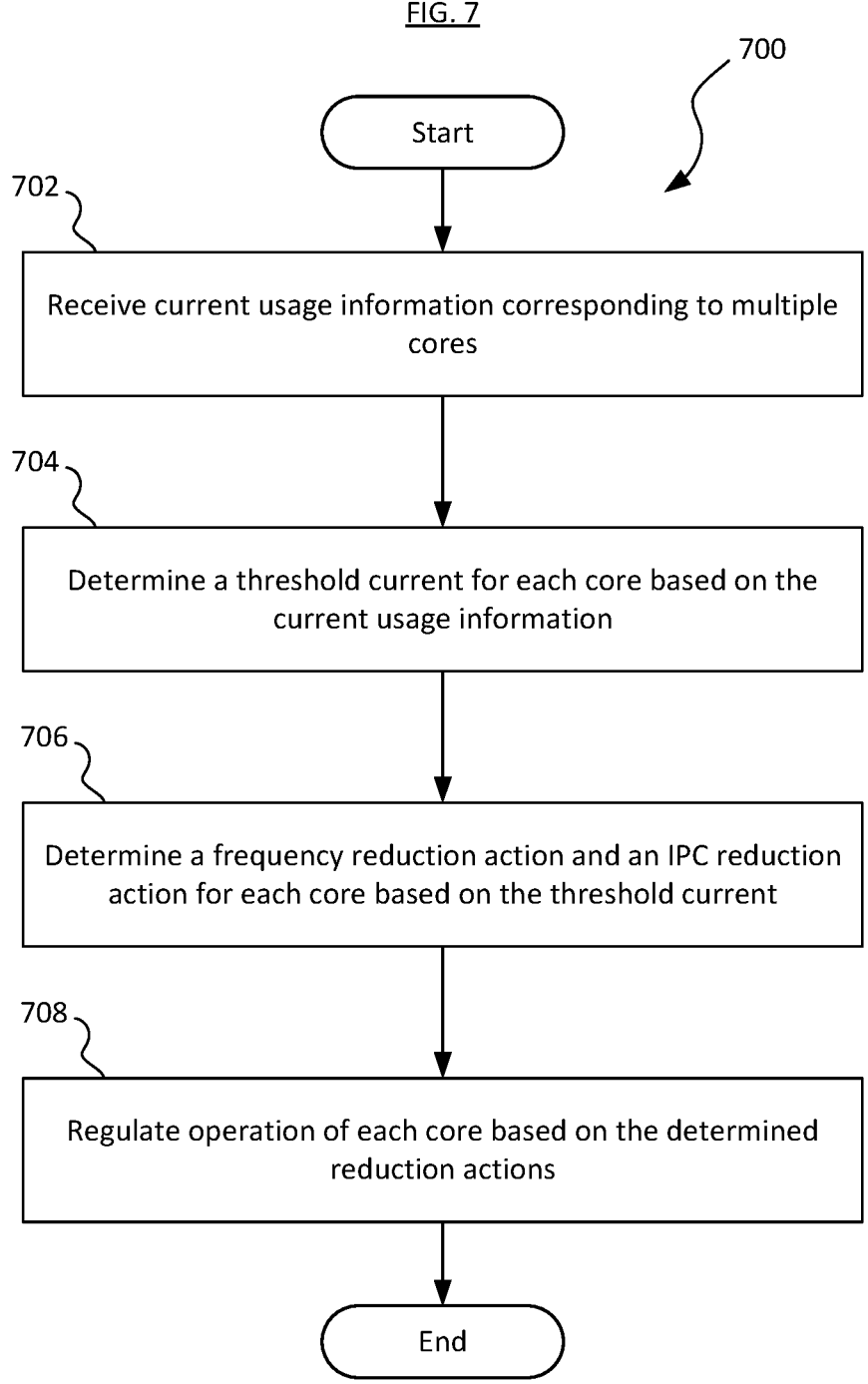

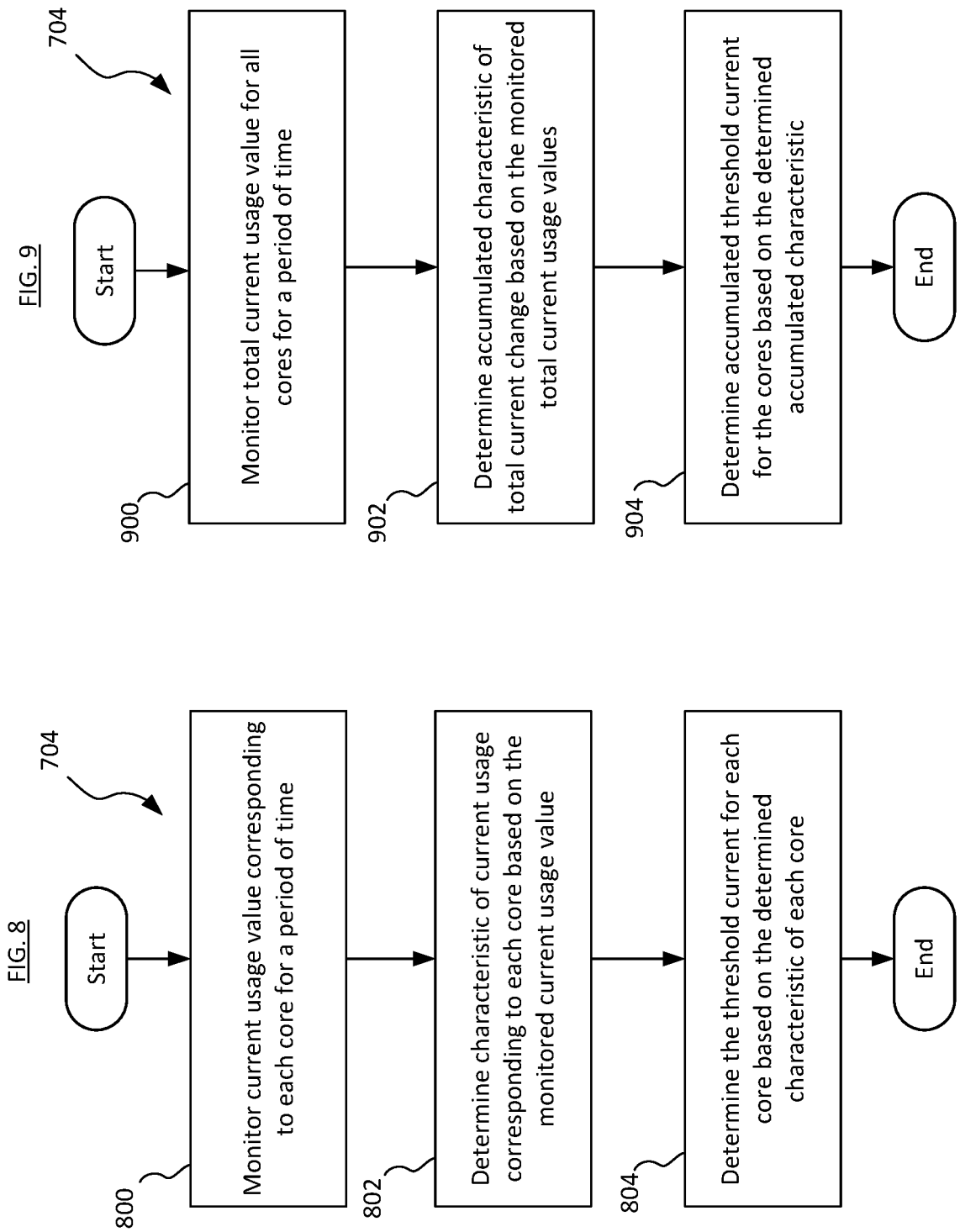

SYSTEM AND METHOD FOR CONTROLLING ELECTRICAL CURRENT SUPPLY IN A MULTI-PROCESSOR CORE SYSTEM VIA INSTRUCTION PER CYCLE REDUCTION

BACKGROUND OF THE DISCLOSURE

When applications are run on processor cores of a multi-processor core system, the application activity may affect how much current is used in the processor cores. Multi-processor core systems are susceptible to high current usage if a number of the processor cores operate at high frequency as a result of high application activity. An over-current event that cannot be supported by the voltage regulator will cause the undesirable scenario of the voltage regulator and the entire system shutting down. Unless other mitigation strategies are used, operating frequency must be reduced to avoid over-current events. This results in a decrease in computer performance.

BRIEF DESCRIPTION OF THE DRAWINGS

The implementations will be more readily understood in view of the following description when accompanied by the below figures, wherein like reference numerals represent like elements, and wherein:

FIG. 7 is an example flow diagram of a process implemented in a multi-processor core system according to embodiments disclosed herein;

FIGS. 8 and 9 are example flow diagrams of a part of the process from FIG. 7;

DETAILED DESCRIPTION OF IMPLEMENTATIONS

Figure 1:
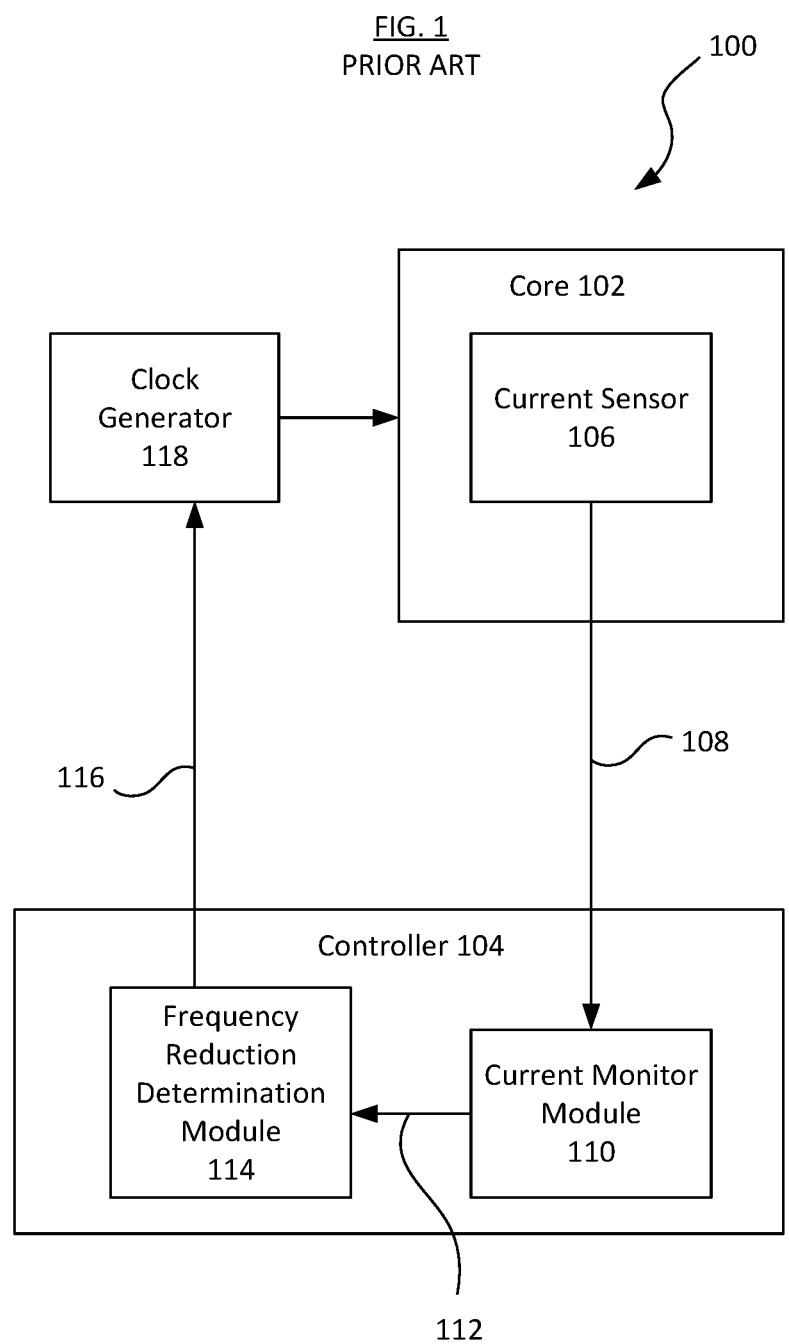
FIG. 1 is an example functional block diagram of a processor core system as known in the art.

Briefly, systems and methods help control the electrical current supplied to a plurality of processing units in a multi-processor core system by reducing the operating frequency as well as the instructions-per-cycle (IPC) for each of the processor cores. In some implementations, the methods include: receiving a plurality of current usage information corresponding to the processing units; determining a threshold current for each of the processing units; determining a frequency reduction action and an IPC reduction action for the each of the processing units based on the threshold current; and regulating operations of the processing units based on the determined frequency and IPC reduction actions.

In some embodiments, the methods further include: determining a voltage reduction action for the each of the processing units based on the threshold current; and regulating the operations of the processing units based on the determined frequency, IPC, and voltage reduction actions. In some examples, the methods further include: determining characteristics of current usage based on the current usage information in the each of the processing units. The frequency reduction action and the IPC reduction action for the each of the processing units are based on the determined characteristics of current usage. The characteristics of current usage may be individually determined for the each of the processing units, and the threshold current may be determined for the each of the processing units based on the individually determined characteristics. Alternatively, the characteristics of current usage corresponding to all the processing units may be aggregated, and the threshold current may be determined for the processing units based on the aggregated characteristics. In some examples, the determined characteristics of current usage include: a measured value of the current usage and a rate of increase for the current usage.

In some embodiments, the methods further include: receiving a power measurement of the each of the processing units. At least one of the frequency reduction action, the IPC reduction action, or the voltage reduction action for the each of the processing units is determined based on the threshold current and the received power measurement.

According to certain implementations, a controller is configured for controlling electrical current supplied to a plurality of processing units in a multi-processor system. The controller receives a plurality of current usage information corresponding to the processing units, determines a threshold current for each of the processing units, determines a frequency reduction action and an instructions-per-cycle (IPC) reduction action for the each of the processing units based on the threshold current, and regulates operations of the processing units based on the determined frequency and IPC reduction actions.

In some embodiments, the controller further determines a voltage reduction action for the each of the processing units based on the threshold current and regulates the operations of the processing units based on the determined frequency, IPC, and voltage reduction actions. In some examples, the controller further determines characteristics of current usage based on the current usage information in the each of the processing units. The frequency reduction action and the IPC reduction action for the each of the processing units are based on the determined characteristics of current usage. The characteristics of current usage may be individually determined for the each of the processing units, and the threshold current is determined for the each of the processing units based on the individually determined characteristics. Alternatively, the characteristics of current usage corresponding to all the processing units may be aggregated, and the threshold current is determined for the processing units based on the aggregated characteristics. The determined characteristics of current usage include: a measured value of the current usage and a rate of increase for the current usage.

In some examples, the frequency reduction action is configured to reduce an operating frequency of the each of the processing units by implementing one or more of: clock stretching, reducing clock generator frequency, reducing phase-lock loop (PLL) frequency, or using a frequency divider. In some examples, the IPC reduction action is configured to reduce an IPC value of the each of the processing units by implementing one or more of: a dispatch operations control unit, or reducing bandwidth of the processing unit.

In some embodiments, the controller further receives power measurement of the each of the processing units. At least one of the frequency reduction action, the IPC reduction action, or the voltage reduction action for the each of the processing units is determined based on the threshold current and the received power measurement. The frequency reduction action or the IPC reduction action for the each of the processing units may be individually and separately determined based on the threshold current and the received power measurement for the each of the processing units. Alternatively, the threshold current may be an aggregated threshold current, and the power measurements corresponding to all the processing units are combined to form an aggregated power measurement, such that the frequency reduction action or the IPC reduction action for all the processing units is determined based on the aggregated threshold current and the aggregated power measurement for the processing units.

According to certain implementations, a computer system includes a clock generator, a plurality of processing units, and a controller operably coupled with the voltage regulator, the clock generator, and the processing units. The controller is configured to control electrical current supplied to the processing units by: receiving a plurality of current usage information corresponding to the processing units; determining a threshold current for each of the processing units; determining a frequency reduction action for the clock generator and an instructions-per-cycle (IPC) reduction action for the each of the processing units based on the threshold current; and regulating operations of the clock generator and the processing units based on the determined frequency and IPC reduction actions.

In some embodiments, the computer system further includes a voltage regulator operably coupled with the plurality of processing units and the controller, such that the controller is further configured to control the electrical current supplied to the processing units by: determining a voltage reduction action for the each of the processing units based on the threshold current; and regulating operation of the voltage regulator based on the determined voltage reduction action.

In some examples, the controller is further configured to control the electrical current supplied to the processing units by determining characteristics of current usage based on the current usage information in the each of the processing units. The frequency reduction action and the IPC reduction action for the each of the processing units are based on the determined characteristics of current usage, and the determined characteristics of current usage may include a measured value of the current usage or a rate of increase for the current usage.

In some examples, each of the plurality of processing units may include a power monitor configured to take power measurement of the corresponding processing unit. The controller may be further configured to control the electrical current supplied to the processing units by: receiving from the power monitors the power measurement of the each of the processing units. At least one of the frequency reduction action, the IPC reduction action, or the voltage reduction action for the each of the processing units is determined based on the threshold current and the received power measurement.

In some examples, the frequency reduction action or the IPC reduction action for the each of the processing units may be individually and separately determined based on the threshold current and the received power measurement for the each of the processing units. In some examples, the threshold current may be an aggregated threshold current, and the power measurements from all the processing units are combined to form an aggregated power measurement, such that the frequency reduction action or the IPC reduction action for all the processing units is determined based on the aggregated threshold current and the aggregated power measurement for the processing units.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

FIG. 1 illustrates a high-level view of a prior-art multi-processor core system 100 which implements the limitations as known in the art. The system 100 includes one or more cores (only one of the cores 102 is shown for simplicity) that are coupled with a controller 104 via a data communication bus to transmit information to and from the core 102 and the controller 104. The core 102 includes a current sensor 106 which detects the current drawn by the core 102 from a power supply (not shown).

The current is associated with the power supply voltage supplied to the core 102 depending upon the amount of power used by it. The amount of drawn current is sent as current value information 108 to the controller 104, which includes a current monitor module 110 to receive the information 108 and determine a current threshold information 112 based on how much current is permitted by the core 102. The current threshold information 112 may include current threshold values determined individually and separately for each of the cores 102, or an aggregated current threshold value corresponding to all the cores 102 altogether.

Because the current is proportional to the clock speed or frequency (that is, e.g., CPU frequency) of the core 102, when a frequency reduction determination module 114 of the controller 104 determines that the current drawn by the core 102 must be reduced according to the current threshold information 112, the frequency reduction determination module 114 provides a frequency reduction action 116 based upon the current threshold information 112 to a clock generator 118 operably coupled to the core 102, where the clock generator 118 changes the clock rate for the core 102 based upon the frequency reduction action 116. The controller 104 thus facilitates current reduction of the core 102 by reducing the frequency at which the core 102 is configured to operate.

However, problems may arise in the aforementioned system 100 when the controller 104 only reduces the operating frequency of the core 102 without considering other factors. For example, reducing the operating frequency of the core 102 necessitates maintaining the workload for the core 102 at a steady rate, or otherwise the core 102 would start operating at a higher current again due to the combination of decreased clock rate or frequency and increased workload, resulting in reduced performance of the system 100. The workload in this case is defined by the instructions per cycle (IPC). For some applications, such as applications limited by memory latency or memory bandwidth, IPC will increase as frequency is decreased. This reduces the effectiveness of reducing operating current by means of reducing operating frequency alone.

Figure 2:
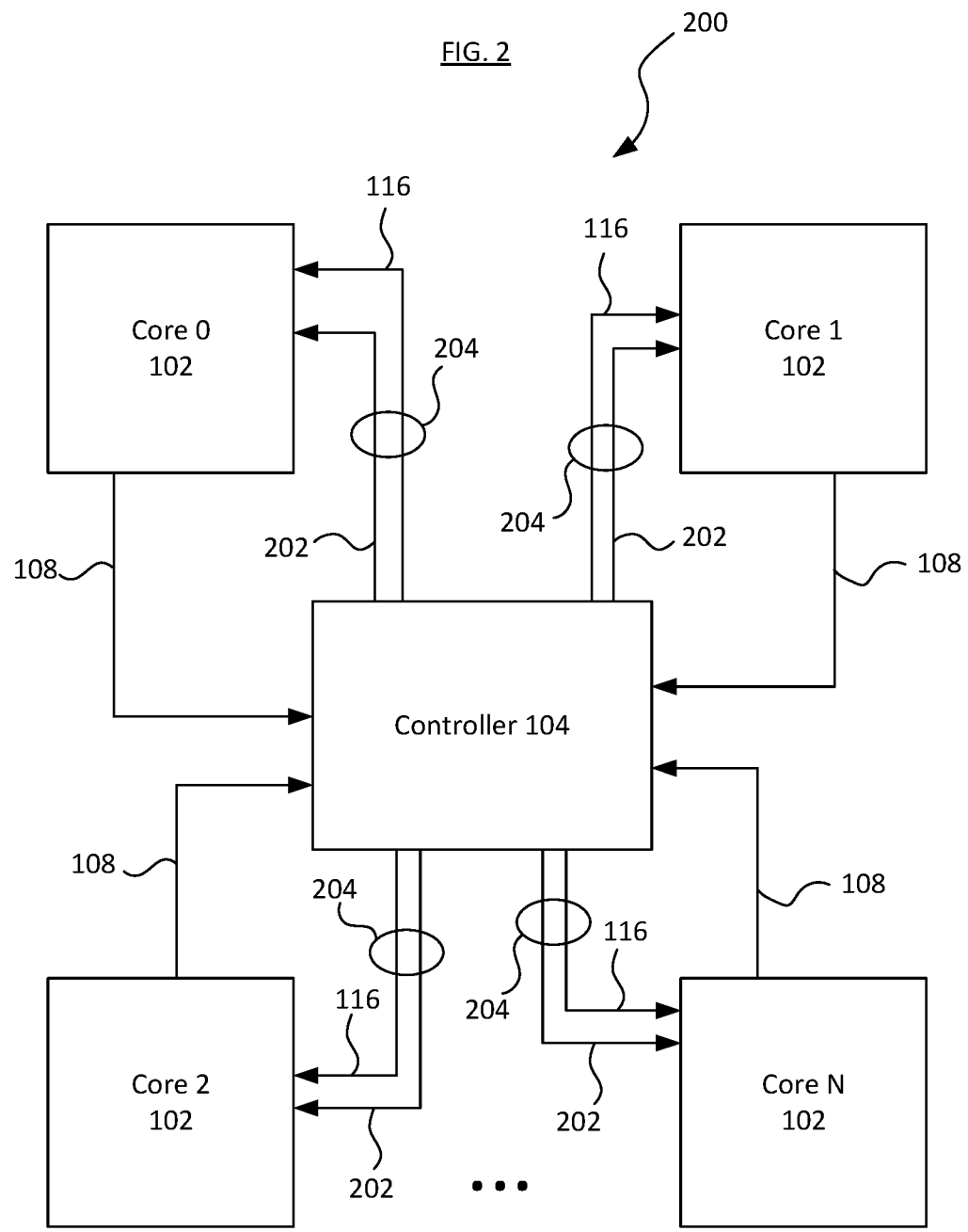
FIG. 2 is an example functional block diagram of a multi-processor core system according to embodiments disclosed herein.

FIG. 2 illustrates a high-level view of an exemplary multi-processor core system 200 according to embodiments disclosed herein. The system 200 in some implementations, solves the aforementioned problem of potentially reduced performance of the core processors by implementing IPC reduction in addition to the frequency reduction action. The system 200 as shown has a plurality of core processing units or cores 102. Any suitable number of cores may be implemented. The controller 104 receives the current information 108 from the cores 102, and provides each core with the determined frequency reduction actions 116 and IPC reduction actions 202. The frequency reduction actions 116 and the IPC reduction actions 202 are collectively called a combined reduction action 204 which is provided by the controller 104 to each of the cores 102.

Figure 3:
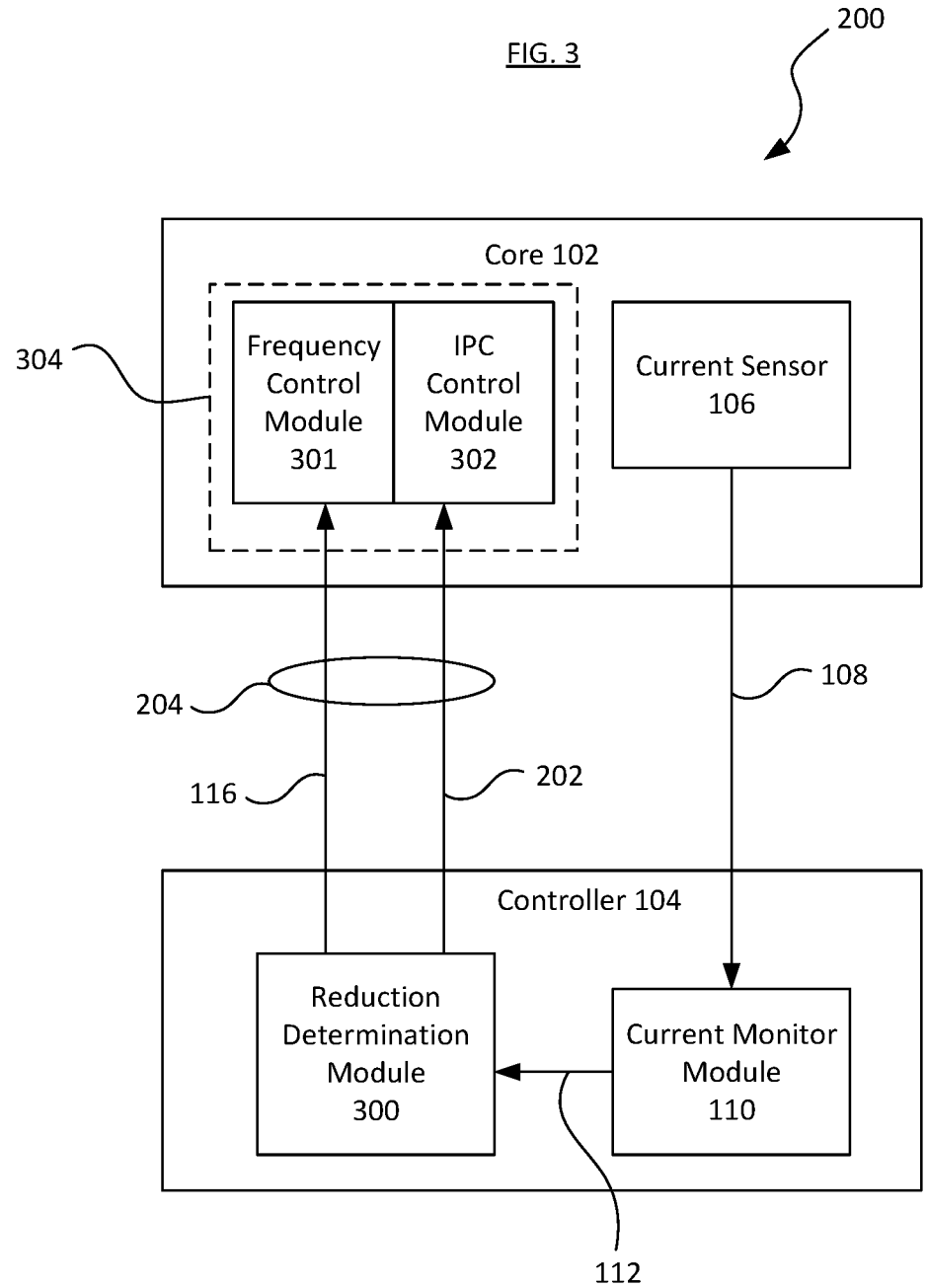
FIG. 3 is a partial representation of the example functional block diagram of FIG. 2 according to embodiments disclosed herein.

FIG. 3 illustrates the system 200 according to embodiments disclosed herein. For simplicity, only the first core 102 is shown, although it is to be understood that each of the additional cores 102 is expected to include similar components and is configured to send and receive similar information or actions, as further explained. In the example shown, the controller 104 includes a reduction determination module 300, which in this case is a frequency and IPC reduction determination module. The reduction determination module 300 receives the current threshold information 112 from the current monitor module 110 and determines the frequency reduction action 116 and the IPC reduction action 202. That is, in addition to reducing the frequency of the core 102, the module 300 also determines the reduction in the number of instructions that can be executed to reduce the possibility of the core 102, now operating at a reduced frequency, increasing its current usage as a result of the increase in workload. The reduction in the IPC is implemented via an IPC control module 302 of the core 102. The frequency control module 301 and the IPC control module 302 are collectively called core state control modules 304.

Figure 4:
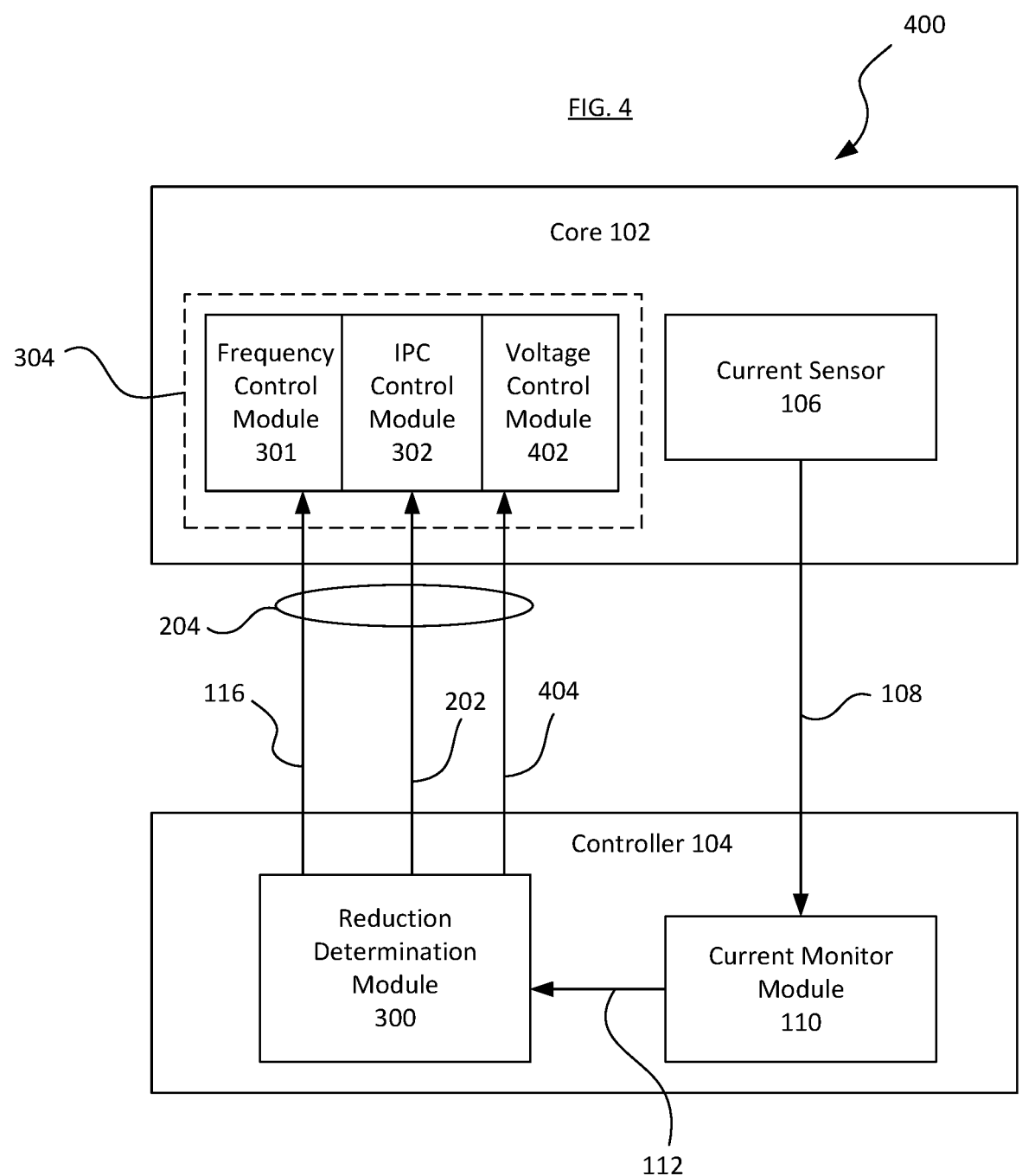
FIG. 4 is another partial representation of the example functional block diagram of FIG. 2 according to embodiments disclosed herein.

FIG. 4 illustrates another a high-level view of an exemplary multi-processor core system 400 according to embodiments disclosed herein, in which the current monitor module 110 provides the current threshold information 112 to the reduction determination module 300, which in this case is a frequency, IPC, and voltage reduction determination module. The module 300 provides the combined reduction action 204 to the core state control modules 304. In this case, the combined reduction action 204 includes the frequency reduction action 116, the IPC reduction action 202, and a voltage reduction action 404; the core state control modules 304 include the frequency control module 301, the IPC control module 302, and a voltage control module 402.

In some implementations, the IPC reduction action 204 and the voltage reduction action 404 may be determined and implemented as follows. For a first input, the difference between a target frequency and an effective achieved frequency is calculated. Based on the calculated difference, a proportional reduction is then calculated to generate a lower target frequency for a first processor core (also referred to herein as "core 0"). For a second input, the difference between a total throttled cycle count and a total available cycles for instructions is calculated. Based on the calculated difference, a proportional reduction of IPC (based on which the IPC reduction action 204 is determined) is then calculated to generate a new lower target frequency for the first processor core. The newly generated lower target frequency from either the first or second input (or in some examples, both first and second inputs) may be used to create a new target frequency for the first core. The new target frequency is then mapped to a new required voltage (based on which the voltage reduction action 404 is determined) for the first core.

The above method may be implemented for each of the cores, from the first core to the last core (also referred to herein as "core N"), as suitable. The processor cores may be evaluated for voltage change or "looped" by a smart firmware (that is, firmware made intelligent with advanced computing capability such as artificial intelligent or machine learning, for example) or any suitable algorithm to facilitate repeating the above process to calculate a new voltage value for each of the cores. In some examples, the looping of the cores may be performed using a hardware wedge, which is a smart algorithm (for example, algorithm using artificial intelligence or machine learning) implemented in one or more hardware logic components. The hardware wedge may include configurable capacity to store discrete voltage and frequency values (for example, in one or more lookup tables) to facilitate determining a target voltage value based on a given target frequency value. The maximum voltage is subsequently chosen among all the newly calculated voltages to determine a new target voltage for all the cores. Finally, the voltage reduction actions 404 may be implemented to change the voltage level of the cores from the current voltage to the new target voltage, as determined.

The module 300 provides the frequency reduction action 116 to the frequency control module 301, the IPC reduction action 202 to the IPC control module 302, and the voltage reduction action 404 to the voltage control module 402 of the core 102. That is, in addition to the frequency and IPC, voltage provided to the core 102 is also reduced in order to reach the current threshold. The actions 116, 202, and 404 are sent in the form of digital signals via any suitable signal communication means such as buses or wires.

In the aforementioned examples, the frequency control module 301 may be a clock generator which controls the clock frequency of the corresponding core or a frequency divider which reduces the input frequency, for example. The IPC control module 302 may be a dispatch unit of the core that is configured to dispatch operations to a scheduler according to instructions received from an instruction cache or a dispatch control unit coupled with the dispatch unit that controls the operations to be dispatched, for example. The voltage control module 402 may be a voltage regulator implemented with or coupled with the core, for example. It is to be understood that these modules may be implemented as part of their respective core, or alternatively be implemented separately but functionally coupled with the cores.

Figure 5:
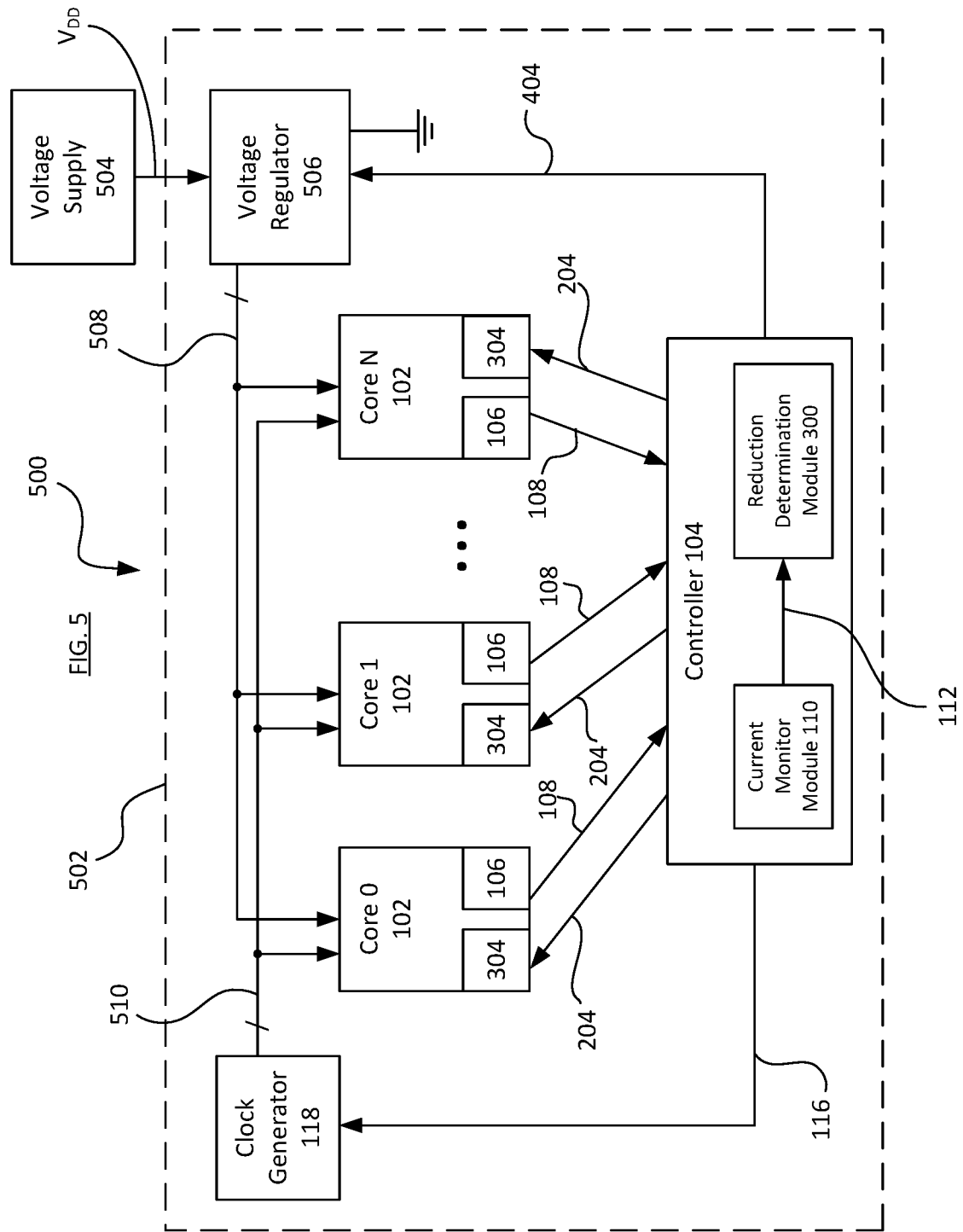
FIG. 5 is another example functional block diagram of a multi-processor core system according to embodiments disclosed herein.

FIG. 5 is a block diagram of one embodiment of an exemplary multi-processor core system 500 according to embodiments disclosed herein. The system 500 includes a total of N+1 cores 102 from core 0 to core N implemented in a common integrated circuit 502. A voltage supply 504 is coupled with the integrated circuit 502 via a voltage regulator 506 thereof. The voltage supply 504 provides a selected input voltage value (VDD) to the voltage regulator 506, which uses the VDD to supply voltage 508 to each of the cores 102. The voltage regulator 506 may be implemented in the integrated circuit 502 which includes the cores 102 or implemented separately from the integrated circuit 502. The voltage regulator 506 provides the supply voltage 508 that is variable according to an operating level provided by the voltage reduction action 404. As such, in this embodiment, the voltage control module 402 of each core 102 may be the voltage regulator 506 located external to the cores 102.

The system 500 also includes the controller 104 coupled to each of the cores 102 which may be a current management unit configured to manage the current level in each of the cores, as discussed further below. In this example, the controller 104 is capable of generating a specific IPC reduction action 202 for each of the cores 102 such that the cores may implement different levels of IPC reduction according to the received action signal 202.

The system 500 further includes a clock generator 118 which may be a phase-locked loop (PLL) coupled to receive a system clock signal and capable of distributing the corresponding clock signals 510 to each of the cores 102. In such examples, the clock signals 510 received by each of the cores 102 are independent of one another. Furthermore, the clock generator 118 may individually control and alter the frequency of each of the clock signals 510 provided to respective ones of the cores 102 independently of one another. As will be discussed in further detail below, the frequency of the clock signal 510 received by any given one of the cores may be increased or decreased in accordance with the frequency reduction action 116 generated by the controller 104. Therefore, in this embodiment, the frequency control module 301 of each core 102 may be the clock generator 118 located external to the cores 102.

The cores 102 each includes the current sensor 106 as well as the core state control modules 304. The modules 304 in some examples include one or more of: the frequency control module 301, the IPC control module 302, or the voltage control module 402. Although it is indicated that the clock generator 118 may be used as the frequency control module 301 and the voltage regulator 506 may be used as the voltage control module 402, according to some examples, the controlling of the frequency and/or voltage for each of the cores 102 may be implemented by the aforementioned module 301 and/or 506, respectively, implemented within each core 102. As such, any suitable combinations of the clock generator 118, the voltage regulator 506, and the per-core control modules 304 may be implemented in controlling the frequency and/or voltage of each core 102.

The controller 104 is capable of generating the reduction actions 116, 202, and 404 corresponding to the cores 102 individually, independent from one another, such that the cores 102 are controlled more flexibly according to the current values as measured by the current sensors 106. Other features of the multi-processor core system 500, such as memory controller, input/output interface, and different engines for display or graphics are not shown for simplicity, although it is understood that such components may be operatively coupled with a northbridge (not shown) as known in the art, and the operation of each of such peripheral devices may affect the current values of the cores as measured by the current sensors.

The system 500 may be any type of processor system such as a central processing unit (CPU) or a graphics processing unit (GPU). For example, the system 500 may be implemented as an x86 processor with x86 64-bit instruction set architecture and is used in desktops, laptops, servers, and superscalar computers; an Advanced Reduced Instruction Set Computer (RISC) Machine (ARM) processor that is used in mobile phones or digital media players; or a digital signal processor (DSP) that is useful in the processing and implementation of algorithms related to digital signals, such as voice data and communication signals, and microcontrollers that are useful in consumer applications, such as printers and copy machines.

The cores 102 form the computational centers of the system 500 and are responsible for performing a multitude of computational tasks. For example, the processor cores 102 may include, but are not limited to, execution units that perform additions, subtractions, shifting and rotating of binary digits, and address generation and load and store units that perform address calculations for memory addresses and the loading and storing of data from memory. The operations performed by the processor cores 102 enable the running of computer applications.

The processor cores 102 operate according to certain performance states (P-states) as controlled by the controller 104. P-states are described as follows. The Advanced Configuration and Power Interface (ACPI) standard is an operating system-based specification that regulates a computer system's power management. For example, the ACPI standard may control and direct the processor cores for better management of battery life. In doing so, ACPI assigns processor power states, referred to as C-states, and forces a processor to operate within the limits of these states. There are varying levels of C-states (e.g., C0 for a fully working state, with full power consumption and full dissipation of energy; C1 for a sleeping state, where execution of instructions are stopped and the processor may return to execute instructions instantaneously; or C2 for another sleeping state where the processor may take longer to go back to C0 state) that a processor may be assigned, along with the corresponding implication for a processor's performance.

While a processor is in the fully working C0 state, it will be associated with another state, referred to as the performance state or the P-state. There are varying levels of P-states that are each associated with an operating voltage and frequency. The highest performance state is P0, which may correspond to maximum operating power, voltage and frequency. However, a processor may be placed in lower performance states, for example P1 or P2, which correspond to lower operating power, voltage and/or frequency. Generally, when a processor moves to a lower P-state it will operate at a lower capacity than before.

In some embodiments, each of the cores 102 may share a voltage plane, in which case each core operates at the same voltage as the other ones. In another embodiment, voltage planes are not shared, and thus the supply voltage received by each core may be set and adjusted independently of the respective supply voltages received by other ones. Thus, operating point adjustments that include adjustments of a supply voltage may be selectively applied to each core independently of the others in embodiments having non-shared voltage planes. In the case where changing the operating point includes changing an operating voltage for one or more of the cores, the controller 104 may change the state of digital signals 404 provided to the voltage regulator 506. Responsive to the change in the signals 404, the voltage regulator 506 may adjust the supply voltage provided to the affected ones of the cores 102.

Figure 6:
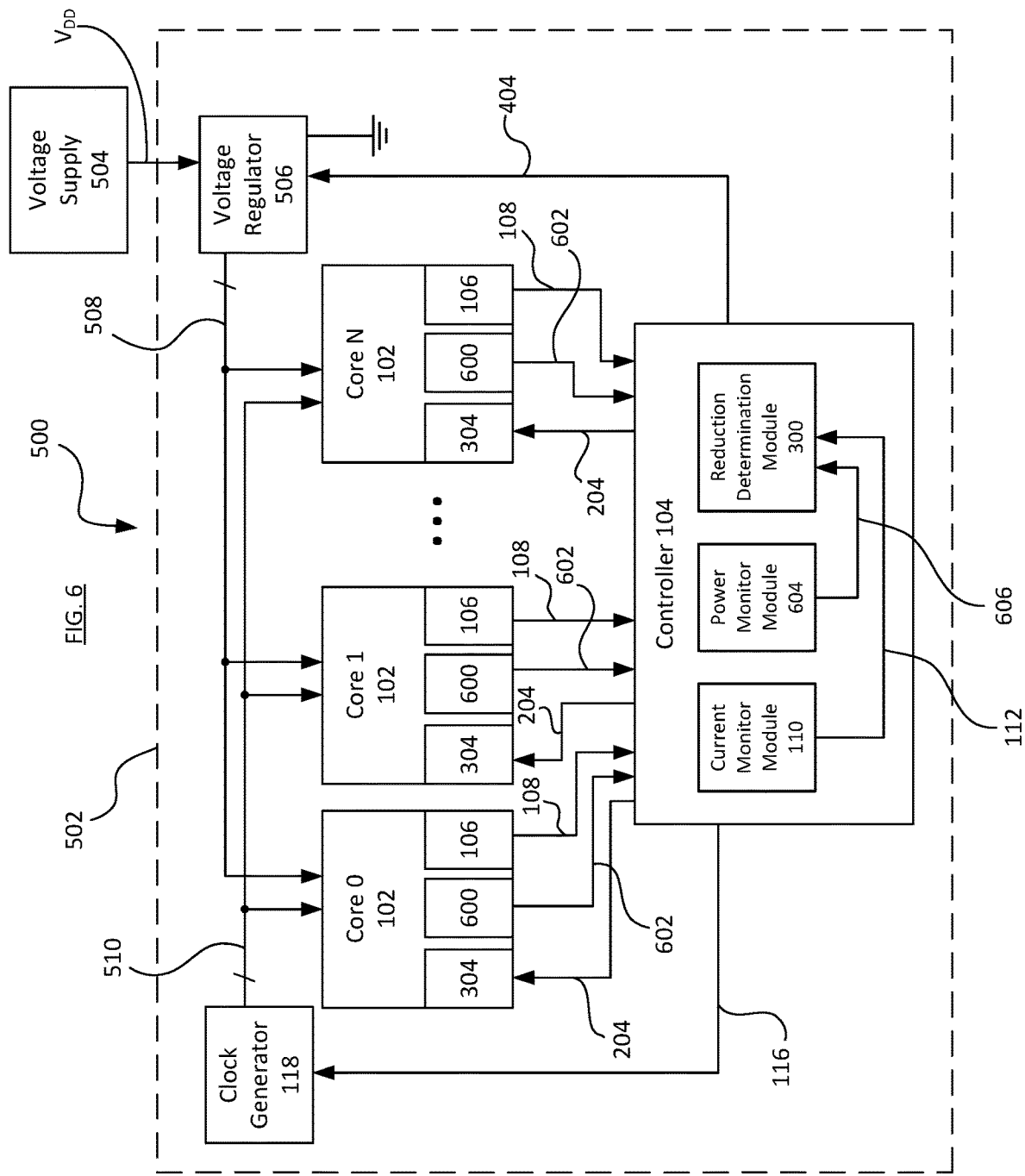
FIG. 6 is an example functional block diagram of a multi-processor core system including a power monitor components according to embodiments disclosed herein.

FIG. 6 is a block diagram of another embodiment of the exemplary multi-processor core system 500 according to embodiments disclosed herein. In this embodiment, each of the cores 102 includes the frequency sensor 106, the core state control modules 304, and a power monitor 600 capable of taking power measurements, e.g. core Cac manager such as distributed power management (DPM) unit, for each of the cores 102. The controller 104 includes, in addition to the current monitor module 110 and the reduction determination module 300, a power monitor module 604 capable of receiving core power measurements 602 from the individual power monitors 600 of the cores 102 and determining, based on the core power measurements 602, a core power threshold information 606. The core power threshold information 606 may include power threshold values determined individually and separately for each of the cores 102, or an aggregated power threshold value corresponding to all the cores 102 altogether.

The reduction determination module 300 then uses the core power threshold information 606 received from the power monitor module 604 and the current threshold information 112 received from the current monitor module 110 to determine the combined reduction actions 204 for the cores 102, which include the frequency reduction action 116 and the IPC reduction action 202, and in some examples also the voltage reduction action 404.

FIG. 7 is a flow diagram of an exemplary process 700 performed by an exemplary multi-processor core system according to embodiments disclosed herein. In step 702 of the process 700, the current usage information corresponding to multiple cores of the system is received, for example from the current sensors coupled with the cores. In step 704, a threshold current is determined for each of the cores based on the current usage information that is received. In some examples, a single threshold current may be determined for all the cores, whereas in other examples, each core has a separately determined threshold current that is flexibly determined based on the usage of the corresponding core.

In step 706, a frequency reduction action and an IPC reduction action is determined for each core based on the threshold current. That is, not only is the frequency (clock rate) of each core reduced, but also the IPC (usually calculated by dividing the number of instructions observed to be executed by the total number of clock cycles during which the executions of instructions were observed) is reduced according to the threshold current. The reduction in frequency and IPC may be determined using any suitable means such as lookup tables or machine learning, for example, based on prior knowledge of how much current can be reduced if operations of certain cores are reduced accordingly.

In step 708, the operation of each core is regulated based on the determined reduction actions from step 706. As previously explained, the regulation of operations may be implemented using any suitable means that may be implemented within the cores or using external components that are operably coupled with the cores, such as the clock generator and/or the voltage regulator, to name a few.

The regulation of operations includes one or more means of reducing the operating frequency of the core and the IPC of the core, and in some examples, also the voltage drawn by the core. The means of reducing frequency includes one or more of the following: clock stretching, reducing clock generator frequency, reducing PLL frequency, or using a frequency divider. The means of reducing IPC includes one or more of the following: using a dispatch operations control unit, or reducing bandwidth of the core. Any combination of the means may be implemented together, as suitable, to facilitate reduction of the core operating state according to the reduction actions.

FIG. 8 is a flow diagram of an exemplary process taken in step 704 of the exemplary process 700 in order to determine the threshold current according to an embodiment. In step 800, the current usage value corresponding to each core is separately and individually monitored for a period of time. In step 802, one or more characteristic of current usage value corresponding to each core is determined based on the monitored current usage values. The characteristic may include any one of the following: the value of the current that is being used by the core (measured in amperes) or the steepness in the rate of change in the value of the current being used (measured in amperes/millisecond), for example.

In step 804, the threshold current is determined for each core based on the determined characteristic(s) of each core. In some examples, if the value of the monitored current usage is deemed too high, the threshold current may be set to be below the value of the current that is observed, according to the determined characteristic. In other examples, if the value of the current being used is increasing at a faster rate than is permitted, the threshold current may be determined such that the current value does not exceed the threshold current at the observed rate of increase, according to the determined characteristic.

FIG. 9 is a flow diagram of another exemplary process taken in step 704 of the exemplary process 700 in order to determine the threshold current according to an embodiment. In step 900, the total current usage value for all the cores is monitored for a period of time. In step 902, one or more accumulated characteristic of the total current change is determined based on the monitored total current usage values.

The accumulated characteristic collectively represents the change in current usage values in all the cores as accumulated or aggregated from each of the cores, instead of monitoring the current usage individually for each core. The accumulation may be performed using data bus interconnecting all the cores such that the current usage values of each core may be transmitted through the data bus to be accumulated. The accumulated characteristic may include any one of the following: the total current usage value of the cores (measured in amperes) or the steepness in the rate of change in the total current usage value (measured in amperes/millisecond), for example. In step 904, accumulated threshold current is determined for the cores based on the determined accumulated characteristic(s) of the cores.

It is to be understood that the usage of the flow diagram in FIG. 8 and is not mutually exclusive of the usage of the flow diagram in FIG. 9. That is, a system according to embodiments disclosed herein may implement both flow diagrams simultaneously such that each core's individual threshold current is determined in addition to the accumulated threshold current for all the cores combined. In such cases, the frequency reduction action and the IPC reduction action may thus be determined based on the individual threshold current as well as the accumulated threshold current as separately and simultaneously determined.

Figure 10:
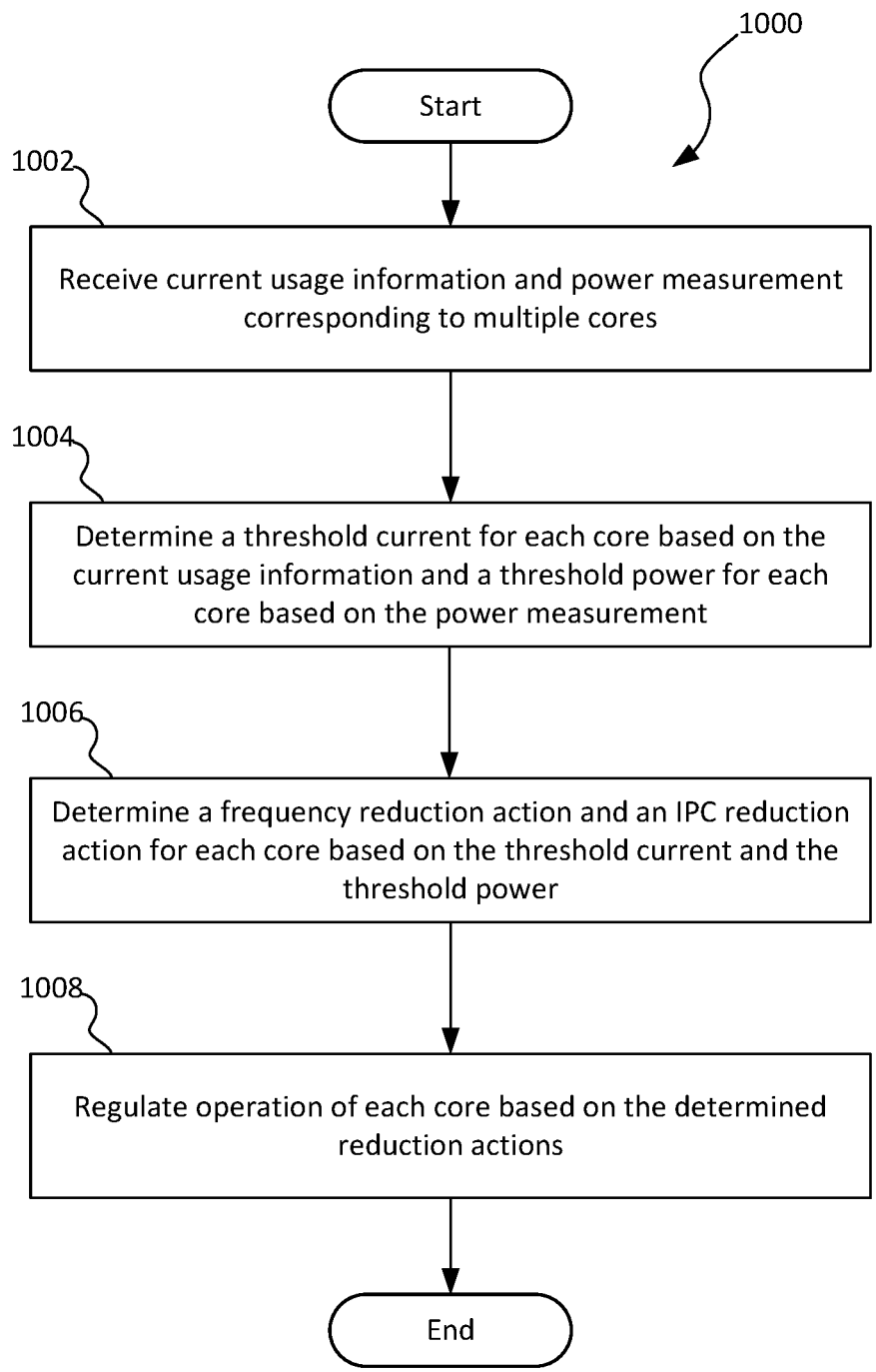
FIG. 10 is an example flow diagram of another process implemented in a multi-processor core system according to embodiments disclosed herein.

FIG. 10 is a flow diagram of an exemplary process 1000 performed by an exemplary multi-processor core system according to embodiments disclosed herein. In step 1002, the current usage information and power measurement corresponding to multiple cores of the system are received, for example from the current sensors and power monitors previously described. In step 1004, a threshold current is determined for each core based on the current usage information. In some examples, a threshold power is also determined for each core based on the corresponding power measurement.

In step 1006, a frequency reduction action and an IPC reduction action corresponding to each core are determined based on the threshold current and the power measurement, or based on the threshold current and the threshold power. In step 1008, the operation of each core is regulated based on the determined reduction actions from step 1006.

In the process 1000, in some examples, the power measurement used in the process may be an instantaneous measurement of power usage corresponding to the monitored core. In some examples, the power measurement may be an average value of multiple power measurements taken during a period of time, such as a predetermined number of clock cycles. Furthermore, in some examples, the determination of reduction actions may be based on individual core measurements or aggregated measurements of all the cores that are accumulated together. The accumulation may be performed using data bus interconnecting all the cores such that the power measurement corresponding to each core may be transmitted through the data bus to be accumulated.

Notable advantage of implementing the systems and processes disclosed herein is an increased efficiency in the use of a processor, improved computer performance, protection of voltage regulators that are implemented in the system, more accurate responses to current events, and a reduced risk of system shutdown, among others. The efficiency of the processor usage is increased by preventing programs from attempting to execute more instructions at each clock cycle when there is a reduction in operating frequency, for example, thereby preventing the processor from negating the effects of reduced operating frequency by increasing the IPC. This also facilitates reducing the likelihood of an over-current event that cannot be supported by the voltage regulator, which in turn reduces the risk of the voltage regulator and the entire system shutting down.

Although features and elements are described above in particular combinations, each feature or element can be used alone without the other features and elements or in various combinations with or without other features and elements. The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be mask works that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A controller for controlling electrical current supplied to a plurality of processing units in a multi-processor system, the controller configured to:
   receive a plurality of current usage information corresponding to the processing units;
   determine a threshold current for each of the processing units;
   determine a frequency reduction action and an instructions-per-cycle (IPC) reduction action for the each of the processing units based on the threshold current; and
   regulate operations of the processing units based on the determined frequency and IPC reduction actions.

2. The controller of claim 1, further configured to:
   determine a voltage reduction action for the each of the processing units based on the threshold current; and
   regulate the operations of the processing units based on the determined frequency, IPC, and voltage reduction actions.

3. The controller of claim 2, further configured to:
   receive power measurement of the each of the processing units, wherein at least one of the frequency reduction action, the IPC reduction action, or the voltage reduction action for the each of the processing units is determined based on the threshold current and the received power measurement.

4. The controller of claim 3, wherein the frequency reduction action or the IPC reduction action for the each of the processing units is individually and separately determined based on the threshold current and the received power measurement for the each of the processing units.

5. The controller of claim 3, wherein the threshold current is an aggregated threshold current, and the power measurements corresponding to all the processing units are combined to form an aggregated power measurement, such that the frequency reduction action or the IPC reduction action for all the processing units is determined based on the aggregated threshold current and the aggregated power measurement for the processing units.

6. The controller of claim 1, further configured to:
   determine characteristics of current usage based on the current usage information in the each of the processing units, wherein the frequency reduction action and the IPC reduction action for the each of the processing units are based on the determined characteristics of current usage.

7. The controller of claim 6, wherein the characteristics of current usage are individually determined for the each of the processing units, and wherein the threshold current is determined for the each of the processing units based on the individually determined characteristics.

8. The controller of claim 6, wherein the characteristics of current usage corresponding to all the processing units are aggregated, and wherein the threshold current is determined for the processing units based on the aggregated characteristics.

9. The controller of claim 6, wherein the determined characteristics of current usage include: a measured value of the current usage and a rate of increase for the current usage.

10. The controller of claim 1, wherein the frequency reduction action is configured to reduce an operating frequency of the each of the processing units by implementing one or more of: clock stretching, reducing clock generator frequency, reducing phase-lock loop (PLL) frequency, or using a frequency divider.

11. The controller of claim 1, wherein the IPC reduction action is configured to reduce an IPC value of the each of the processing units by implementing one or more of: a dispatch operations control unit, or reducing bandwidth of the processing unit.

12. A computer system comprising:
   a clock generator;
   a plurality of processing units; and
   a controller operably coupled with the voltage regulator, the clock generator, and the processing units, the controller configured to control electrical current supplied to the processing units by:
      receiving a plurality of current usage information corresponding to the processing units;
      determining a threshold current for each of the processing units;
      determining a frequency reduction action for the clock generator and an instructions-per-cycle (IPC) reduction action for the each of the processing units based on the threshold current; and
      regulating operations of the clock generator and the processing units based on the determined frequency and IPC reduction actions.

13. The system of claim 12, further comprising a voltage regulator operably coupled with the plurality of processing units and the controller, the controller further configured to control the electrical current supplied to the processing units by:
   determining a voltage reduction action for the each of the processing units based on the threshold current; and
   regulating operation of the voltage regulator based on the determined voltage reduction action.

14. The system of claim 13, the each of the plurality of processing units comprising a power monitor configured to take power measurement of the corresponding processing unit, the controller further configured to control the electrical current supplied to the processing units by:
   receiving from the power monitors the power measurement of the each of the processing units, wherein at least one of the frequency reduction action, the IPC reduction action, or the voltage reduction action for the each of the processing units is determined based on the threshold current and the received power measurement.

15. The system of claim 14, wherein the frequency reduction action or the IPC reduction action for the each of the processing units is individually and separately determined based on the threshold current and the received power measurement for the each of the processing units, and
   wherein the threshold current is an aggregated threshold current, and the power measurements from all the processing units are combined to form an aggregated power measurement, such that the frequency reduction action or the IPC reduction action for all the processing units is determined based on the aggregated threshold current and the aggregated power measurement for the processing units.

16. The system of claim 12, the controller further configured to control the electrical current supplied to the processing units by:
   determining characteristics of current usage based on the current usage information in the each of the processing units, wherein the frequency reduction action and the IPC reduction action for the each of the processing units are based on the determined characteristics of current usage,
   wherein the determined characteristics of current usage include: a measured value of the current usage and a rate of increase for the current usage.

17. A method for controlling electrical current supplied to a plurality of processing units in a multi-processor system, the method comprising:
   receiving a plurality of current usage information corresponding to the processing units;
   determining a threshold current for each of the processing units;
   determining a frequency reduction action and an instructions-per-cycle (IPC) reduction action for the each of the processing units based on the threshold current; and
   regulating operations of the processing units based on the determined frequency and IPC reduction actions.

18. The method of claim 17, further comprising:
   determining a voltage reduction action for the each of the processing units based on the threshold current; and
   regulating the operations of the processing units based on the determined frequency, IPC, and voltage reduction actions.

19. The method of claim 17, further comprising:
   determining characteristics of current usage based on the current usage information in the each of the processing units, wherein the frequency reduction action and the IPC reduction action for the each of the processing units are based on the determined characteristics of current usage,
   wherein either (a) the characteristics of current usage are individually determined for the each of the processing units, and the threshold current is determined for the each of the processing units based on the individually determined characteristics, or (b) the characteristics of current usage corresponding to all the processing units are aggregated, and the threshold current is determined for the processing units based on the aggregated characteristics.

20. The method of claim 18, further comprising:
receiving a power measurement of the each of the processing units,
wherein at least one of the frequency reduction action, the IPC reduction action, or the voltage reduction action for the each of the processing units is determined based on the threshold current and the received power measurement.

\* \* \* \* \*